US011326390B2

United States Patent
Seong et al.

(10) Patent No.: US 11,326,390 B2
(45) Date of Patent: May 10, 2022

(54) APPARATUS FOR APPLICATION OF FOAM SPACER

(71) Applicant: IGIS CO., LTD., Jeollanam-do (KR)

(72) Inventors: Chi Won Seong, Anyang-si (KR); Sung Chul Moon, Gwangju (KR); Sang Woo Kim, Gwangju (KR); Bo Gook Lee, Gwangyang-si (KR); Jun Won Cha, Gwangju (KR); Hyeong Il Kim, Gwangju (KR)

(73) Assignee: IGIS CO., LTD., Jeollanam-do (KR)

( * ) Notice: Subject to any disclaimer, the term of this patent is extended or adjusted under 35 U.S.C. 154(b) by 184 days.

(21) Appl. No.: 16/791,201

(22) Filed: Feb. 14, 2020

(65) Prior Publication Data

US 2021/0071467 A1 Mar. 11, 2021

(30) Foreign Application Priority Data

Sep. 9, 2019 (KR) ........................ 10-2019-0111462

(51) Int. Cl.
*E06B 3/673* (2006.01)
*E06B 3/663* (2006.01)
*B29C 65/00* (2006.01)

(52) U.S. Cl.
CPC ........ *E06B 3/6733* (2013.01); *E06B 3/66328* (2013.01); *E06B 3/66342* (2013.01); *B29C 66/40* (2013.01); *E06B 3/67365* (2013.01); *E06B 3/67373* (2013.01); *E06B 3/67391* (2013.01); *E06B 2003/67378* (2013.01)

(58) Field of Classification Search
CPC ............. E06B 3/67365; E06B 3/67373; E06B 3/67378; E06B 3/67391; E06B 3/6773; E06B 2003/67378
See application file for complete search history.

(56) References Cited

U.S. PATENT DOCUMENTS 4,886,410 A * 12/1989 Lisec .................. E06B 3/67365
414/27
2012/0055010 A1* 3/2012 Milburn .................. E06B 3/673
29/527.1

FOREIGN PATENT DOCUMENTS

KR 20-0128815 Y1 11/1998
KR 10-0995879 B1 11/2010
(Continued)

OTHER PUBLICATIONS

English machine translation of applicant cited KR 10-1335588. (Year: 2013).*
(Continued)

*Primary Examiner* — Donald J Loney
(74) *Attorney, Agent, or Firm* — Rabin & Berdo, P.C.

(57) ABSTRACT

A foam spacer applicator may include: a conveyer unit configured to automatically transfer a glass panel; a foam head unit disposed at a predetermined distance from the front side of the conveyer unit, and configured to automatically supply and bond a spacer to the glass panel transferred from the conveyer unit through a combination of an X-axis horizontal operation and a Y-axis elevation operation through an elevation guide plate disposed with a vertical structure; and a magazine unit disposed at a predetermined distance from the rear side of the foam head unit, and configured to inject and apply a sealant to both surfaces of the spacer while adjusting tension of the spacer, and automatically supply the spacer to the foam head unit.

9 Claims, 24 Drawing Sheets

(56) References Cited

FOREIGN PATENT DOCUMENTS

KR 10-1335588 B1 12/2013
KR 10-2016-0131286 A 11/2016

OTHER PUBLICATIONS

Machine translation of applicant cited KR 10-/2016-0131286 (Year: 2016).*

* cited by examiner

APPARATUS FOR APPLICATION OF FOAM SPACER

BACKGROUND

1. Technical Field

The present disclosure relates to a foam spacer applicator, and more particularly, to a foam spacer applicator which can automatically bond a spacer to a glass panel while automatically supplying the spacer for maintaining a space between glass panels.

2. Related Art

In general, the existing process of manufacturing an insulated glass unit requires applying a spacer which can maintain a predetermined space between glass panels in the insulated glass unit.

The spacer may be bonded through a process of sealing the edges of the glass panels, in order to maintain the predetermined space between the glass panels. Such a predetermined space (air layer) may be filled with specific gas.

In other words, the spacer may maintain the predetermined space between the glass panels to allow injection of the specific gas into the space (air layer), and the specific gas injected into the space (air layer) may block conduction of heat or sound waves, and thus improve heat insulation performance, sound insulation performance and anti-condensation performance.

As such, the method for processing a spacer is very important in the process for manufacturing an insulated glass unit. The existing method for processing a spacer includes a spacer cutting process of cutting a spacer made of aluminum according to the size of a glass panel, a desiccant injection process of injecting a desiccant into the spacer, a polyisobutylene resin coating process of coating the spacer with polyisobutylene resin, a corner cut process of cutting corners of the spacer, and a spacer bonding process of bonding the spacer along the edge of the glass surface.

As the method for processing a spacer, such series of process, i.e. the spacer cutting process, the desiccant injection process, the polyisobutylene resin coating process, the corner cut process and the spacer bonding process, are all performed as manual processes by operators.

Since the existing method for processing a spacer includes the processes which are manually performed by operators, the manufacturing cost of the insulated glass unit is raised by the increase in personnel expenses by the input of manpower. When the processes are delayed, the production of final insulated glass products is reduced, which makes it difficult to meet the due dates of insulated glass products for customers.

Since the existing method for processing a spacer includes the processes which are manually performed by operators, the task concentrations of the operators are inevitably reduced by accumulation of fatigue which occurs when the operators work for a long time. Thus, defects or faults around portions of the insulated glass product, to which the spacer is applied, are increased, and the safety of the operators cannot be guaranteed.

RELATED ART DOCUMENT

Patent Document (Patent Document 0001): Korean Patent No. 10-0995879

SUMMARY

Various embodiments are directed to a foam spacer applicator which can integrate a series of manual processes into an automated process, the series of manual processes including manually bonding a spacer across edges of glass panels and processing the spacer.

In an embodiment, a foam spacer applicator may include: a conveyer unit configured to automatically transfer a glass panel; a foam head unit disposed at a predetermined distance from the front side of the conveyer unit, and configured to automatically supply and bond a spacer to the glass panel transferred from the conveyer unit through a combination of an X-axis horizontal operation and a Y-axis elevation operation through an elevation guide plate disposed with a vertical structure; and a magazine unit disposed at a predetermined distance from the rear side of the foam head unit, and configured to inject and apply a sealant to both surfaces of the spacer while adjusting tension of the spacer, and automatically supply the spacer to the foam head unit.

The foam head unit may include: a pair of X-axis moving structures moved forward/backward through one set of X-axis rails which are arranged with a horizontal structure and engaged with the X-axis moving structures, at one surface of an elevation plate which is connected as a vertical structure engaged with the elevation guide plate and moved upward/downward; power units coupled to the other surface of the elevation plate so as to provide power required for an elevation operation of the elevation plate, and coupled to the rear end of the elevation plate so as to be disposed at a predetermined distance therebetween in a vertical direction and configured to provide power required for the forward/backward operation of the X-axis moving structure; and a pair of foam assemblies coupled to the X-axis moving structures through combination with the X-axis moving structures, and configured to perform an operation of bonding the spacer across the edge of a front surface of the glass.

The foam assembly may further include: a ring gear rotatably installed at the front end of an inlet pipe, and having a larger inner diameter than the diameter of the inlet pipe; a plurality of zigzag guide rolls arranged with a vertical structure at the front of the ring gear, and configured to guide the spacer forward in a zigzag manner; a turning inducement roller rotatably installed in an open case disposed beside a plate installed at the front of the zigzag guide rolls, and configured to induce the turning direction of the spacer exposed through the zigzag guide rolls; a turning roller located at the front of the turning inducement roller while maintaining a predetermined distance from the turning inducement roller, and rotatably installed to decide whether to turn the direction of the spacer; a track separation prevention roller located at the front of the turning roller while maintaining a predetermined distance from the turning roller; and configured to prevent track separation of the spacer; and a bonding roller located beside the track separation prevention roller and disposed ahead of the track separation prevention roller, while maintaining a predetermined distance from the track separation prevention roller, and configured to induce and bond the spacer across the edge of the front surface of the glass panel.

The foam spacer applicator may further include: a pair of drawing rollers located beside the bonding roller and disposed behind the bonding roller, while maintaining a predetermined distance from the bonding roller, and configured to draw the spacer; a cutting point configured as a structure for forming a space beside the drawing rollers while maintaining a predetermined distance from the drawing rollers, and serving as a cutting point of the spacer; a cylinder installed at the cutting point under the plate installed at the front of the zigzag guide rolls, and configured to provide power required for moving a rod forward; and a cutter blade installed at the cutting point and configured to cut a part of the spacer introduced to the cutting point at an angle of 90° or more by the operation of moving the rod forward using the power of the cylinder.

The foam spacer applicator may further include a ring gear rotatably installed at the front end of the X-axis moving structure, while surrounding the outer circumference of the front end of the inlet pipe without coming in contact with the front end of the inlet pipe, and configured to rotate the zigzag guide rolls, the turning inducement roller, the turning roller, the track separation prevention roller, and the foam assembly at an angle of 90° or more, the foam assembly including the bonding roller, the drawing rollers, the cutting point, the cylinder and the cutter blade.

The foam spacer applicator may further include: a rotation power motor coupled to a portion of the X-axis moving structure corresponding to one side of the ring gear and configured to provide rotation power of the ring gear; and a gear coupled to a shaft of the rotation power motor and engaged with the ring gear.

The power unit may further include: a Y-axis power motor coupled to the other surface of the elevation plate, and configured to provide power required for an elevation operation of the elevation plate; and a pair of X-axis power motors coupled to the rear end of the elevation plate while maintaining a distance from each other in the vertical direction, and configured to provide power required for the forward/backward operation of the X-axis moving structure.

The foam assembly may bend the spacer at an angle of 90° or more, while rotated at an angle of 90° or more in an edge corner of the front surface of the glass panel through the rotation of the ring gear.

The magazine unit may further include: a pair of winding rolls rotatably installed on both inner sides of a box-shaped plate which has a compartmented structure to form the exterior of the magazine unit, and configured to unwind the wound spacer; a first guide roll rotatably installed in a compartmented area above the winding roll, and configured to guide the spacer unwound by the winding roll; a tension adjusting roller located under the front of the first guide roll while maintaining a predetermined distance from the first guide roll, connected as an engagement structure which is movable upward/downward, and configured to adjust tension of the spacer guided through the first guide roll; and a second guide roll rotatably installed above the front of the tension adjusting roller while maintaining a predetermined distance from the tension adjusting roller, and configured to guide the spacer, whose tension is adjusted through the tension adjusting roller, to the outside of the magazine unit. The first guide roll, the tension adjusting roller and the second guide roll may be disposed in an inverse triangle shape.

The foam spacer applicator may further include a rail disposed in a vertical direction so as to be engaged with the tension adjusting roller for an operation of moving the tension adjusting roller upward/downward.

The foam spacer applicator may further include: a pair of coating pressure parts installed in a front area of the winding roll, and configured to store a sealant and provide pressure for injecting the sealant to both side surfaces of the spacer; a pair of two sets of injection blocks arranged above the coating pressure parts so as to face each other, and configured to inject and apply the sealant to both side surfaces of the spacer guided through the second guide roll; a plurality of first direction turning rolls installed at a higher position than the injection blocks between the injection blocks, and configured to horizontally guide the spacer while restricting the direction of the spacer passed between the injection blocks; and a second direction turning rolls located ahead of the first direction turning roll while maintaining a predetermined distance from the first direction turning roll, and configured to change the direction of the spacer to the reverse direction.

The foam spacer applicator may further include: a tension adjusting roller mounted on the top of the magazine unit, connected and engaged with rails formed on both sides of a tension adjusting structure inclined toward the foam head unit, and configured to adjust the tension of the spacer while changing the direction of the spacer guided through the second direction turning roll to the forward direction; and a pair of ending supply rolls rotatably installed at the front end of the tension adjusting structure, and configured to supply and guide the spacer, whose tension thereof is adjusted by the tension adjusting roller, to the foam head unit.

The conveyer unit may further include: a feeding conveyer configured to feed the glass panel; and a transfer conveyer disposed beside the feeding conveyer while maintaining a predetermined distance from the feeding conveyer, and configured to transfer the glass introduced into the feeding conveyer to another facility line.

The foam spacer applicator may further include: an adhesion transfer path installed at rear ends of glass panel transfer paths coupled to a frame structure with a symmetrical structure at the bottoms of the feeding conveyer and the transfer conveyer, and extended from the feeding conveyer to the transfer conveyer; and a plurality of adhesion parts engaged with a rail formed at the top of the adhesion transfer path, adhered to a lower central portion of a rear surface of the glass panel so as to transfer the glass panel from the feeding conveyer to the transfer conveyer, and to move the glass panel by a predetermined distance to the left/right while the spacer is bonded across the edge of the front surface of the glass panel by the foam head unit.

In accordance with the embodiment of the present disclosure, it is possible to provide the foam spacer applicator which can integrate the series of manual processes for manually bonding the spacer across the edges of the glass panels, into one automated process, thereby significantly improve the efficiency of the spacer bonding process.

Furthermore, as the spacer bonding process is automated, the productivity and production of insulated glass products which are finally manufactured can be significantly improved.

Furthermore, as the spacer bonding process is automated, it is possible to prevent a personnel accident which frequently occurs, and to significantly reduce a fault and defect rate related to the spacer bonding.

Furthermore, as the spacer bonding process is automated, the manufacturing cost can be reduced to lower the unit price of the final insulated glass product, which makes it possible to gain a competitive advantage over products of other companies.

DETAILED DESCRIPTION

Figure 1:
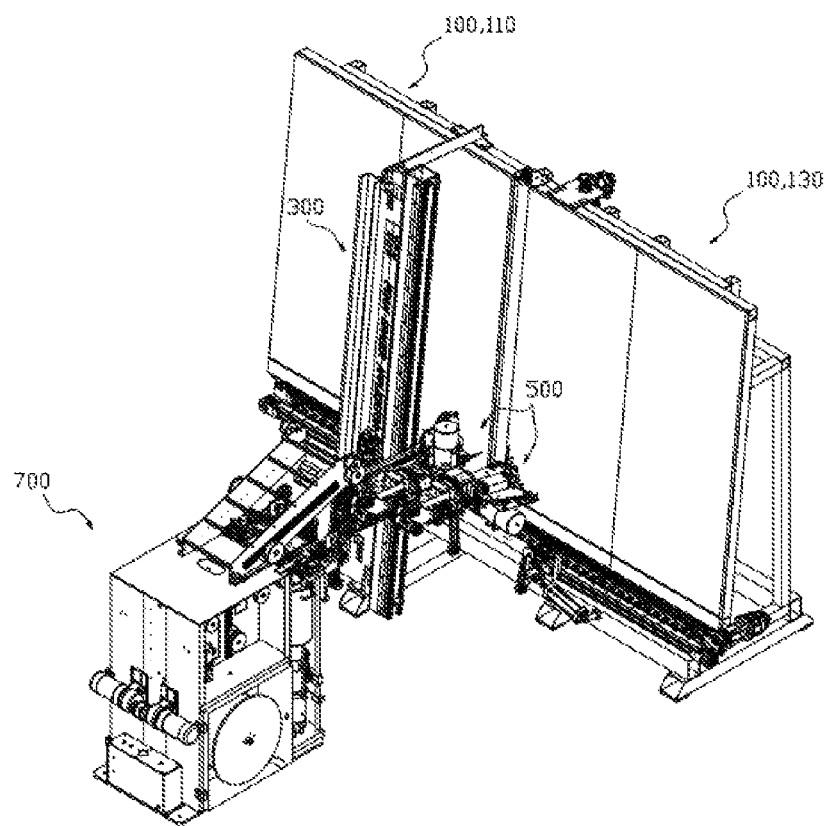
FIG. 1 is a 3D view illustrating a foam spacer applicator in accordance with an embodiment of the present disclosure, when seen from one side.
Figure 2:
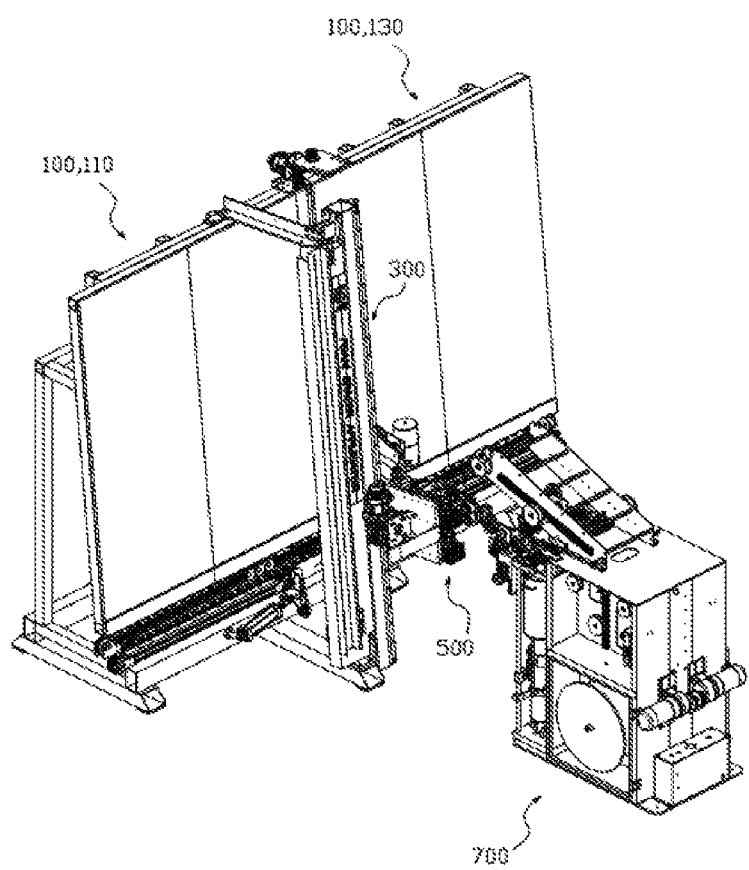
FIG. 2 is a 3D view illustrating the foam spacer applicator in accordance with the embodiment of the present disclosure, when seen from another side.

In the figures, the dimensions of layers and regions are exaggerated for clarity and convenience of illustration. The following embodiments do not limit the scope of the present disclosure, are only examples of components described in the claims of the present disclosure, and should be analyzed based on the technical sprit of the present disclosure throughout the specification.

An insulated glass unit refers to a product in which a predetermined space (air layer) is provided between two or more glass panels by a spacer for maintaining a space between the glass panels and filled with dry air or specific gas, and the edges of the glass panels are sealed by an adhesive. Since the dry air layer between the glass panels blocks conduction of heat or sound waves, heat insulation performance, sound insulation performance and anti-condensation performance can be improved.

The process of manufacturing such an insulated glass unit accompanies a production and processing facility line in which various devices serving different functions at respective processes are integrated with one another to manufacture an insulated glass unit, and a foam spacer applicator in accordance with an embodiment of the present disclosure is an automated apparatus which can collectively perform manual processes of the existing method for processing a spacer, which is accompanied by the process of manufacturing an insulated glass unit.

Hereafter, the foam spacer applicator in accordance with the embodiment of the present disclosure will be described in detail with reference to the accompanying drawings.

As illustrated in FIGS. 1 to 3 and 11 to 13, the foam spacer applicator in accordance with the embodiment of the present disclosure may include a conveyer unit 100, a foam head unit 500, and a magazine unit 700. The conveyer unit 100 serves to transfer a glass panel G. The foam head unit 500 serves to bond a spacer S to the glass panel transferred from the conveyer unit by a combination of an X-axis horizontal operation and a Y-axis elevation operation through an elevation guide plate 300 which is vertically disposed at a predetermined distance from the front side of the conveyer unit 100. The magazine unit 700 is disposed at a predetermined distance from the rear side of the foam head unit, and serves to inject and apply a sealant to both side surfaces of the spacer S while adjusting tension of the spacer S, and supply the spacer S to the form head part.

In the following descriptions of the present disclosure, components having the same functions and structures will be represented by like reference numerals.

Figure 4:
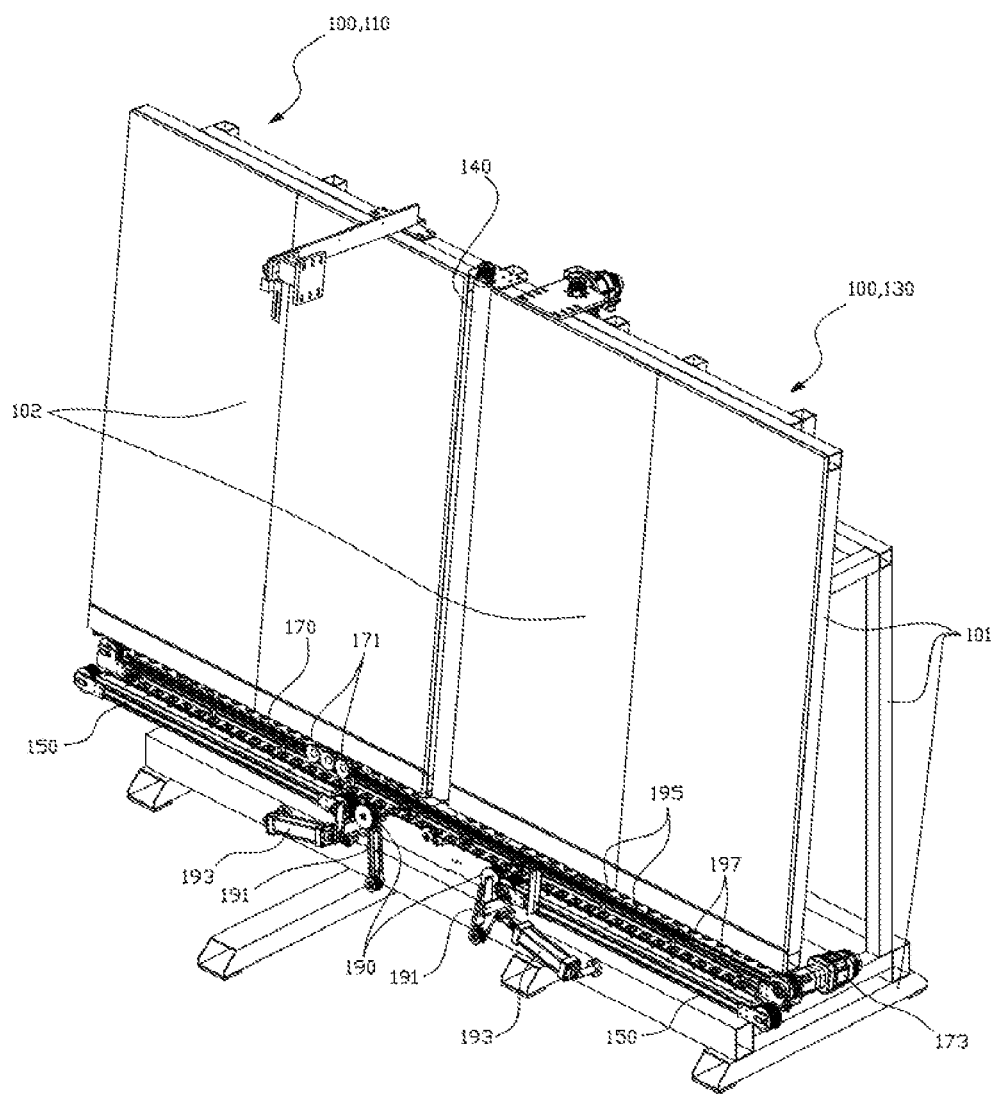
FIG. 4 is a 3D view illustrating the front side of the conveyer unit.
Figure 5:
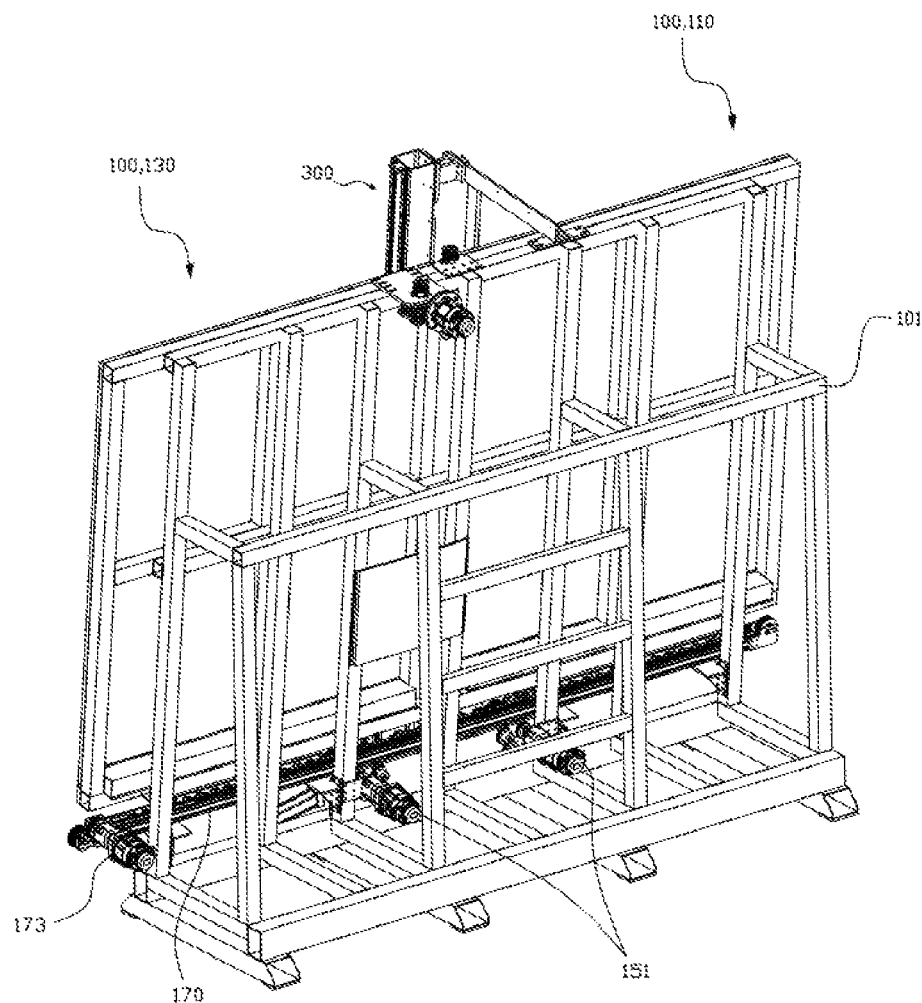
FIG. 5 is a 3D view illustrating the rear side of the conveyer unit illustrated in FIG. 4.

As illustrated in FIGS. 4 and 5, the conveyer unit 100 may include a support plate 102 for supporting the rear surface of the glass panel G, a frame structure 101 for supporting the rear surface of the support plate 102, a feeding conveyer 110 for feeding the glass panel G, and a transfer conveyer 130 for transferring the glass panel G, and have a structure in which the transfer conveyer 130 and the feeding conveyer 110 are disposed in a line with a predetermined distance provided therebetween. Between the feeding conveyer 110 and the transfer conveyer 130, a long roller 140 for flexibly connecting and transferring the glass panel G may be provided. The long roller 140 may be rotated while coming in contact with the entire rear surface of the glass panel G, and thus flexibly connect and transfer the glass panel G from the feeding conveyer 110 to the transfer conveyer 130.

Under the feeding conveyer 110 and the transfer conveyer 130, a glass panel transfer path 150 and an adhesion transfer path 170 may be coupled to the bottom of the frame structure 101 across an area from the feeding conveyer 110 to the transfer conveyer 130. The glass panel transfer path 150 is located at the front of the adhesion transfer path 170, and the adhesion transfer path 170 is located at the rear of the glass panel transfer path 150, and disposed at a higher position than the glass panel transfer path 150.

In particular, the conveyer unit 100 may include a pair of glass panel transfer paths 150, any one of the glass panel transfer paths 150 may be disposed in the area of the feeding conveyer 110 on the left side, and the other glass panel transfer path 150 may be disposed in the area of the transfer conveyer 130 on the right side. The glass panel transfer paths 150 may have a predetermined distance provided therebetween, and a glass power motor 151 for providing power required for a rotation trajectory operation of a conveyer belt for transferring a glass panel on the glass panel transfer paths 150 may be provided as a shaft structure across an area from the bottom of the rear end of the adhesion transfer path 170 to the glass panel transfer paths 150.

The adhesion transfer path 170 may be disposed at the rear end of the glass panel transfer path 150 across the area from the feeding conveyer 110 to the transfer conveyer 130 and located at a higher position of the glass panel transfer path 150, and an adhesion power motor 173 may be provided on any one side of the adhesion transfer path 170, and provide power to move an adhesion part 171 engaged with a rail at the top of the adhesion transfer path 170. The adhesion part 171 may also be coupled to the conveyer belt and moved while engaged with the rail.

The adhesion part 171 may adhere to the center of the rear surface of a lower portion of the glass panel G, in order to improve the mobility of the glass panel G, which is required for bonding the spacer S along the edge of the front surface of the glass panel G.

Under the pair of glass panel transfer paths 150, a pair of cylinders 193 which are symmetrical with each other are connected to the bottom of the frame structure 101 through a hinge structure. The cylinder 193 is connected with a structure in which an end of a rod is hinged to a central portion of each hinge rod 191, and an overturn prevention roller 190 is rotatably connected to one end of the hinge rod 191.

The overturn prevention rollers 190 may be located between the glass panel transfer paths 150, i.e. at positions corresponding to the distance between the glass panel transfer paths 150 so as to face each other, and thus prevent an overturn of the glass panel G, which may occur due to a weight imbalance at the point of time that the glass panel G enters the transfer conveyer 130 after being introduced into the feeding conveyer 110.

At this time, as the hinge rod 191 is rotated around a hinge shaft at the other end thereof through an operation in which the rod is moved backward by the operation of the cylinder 193, the overturn prevention roller 190 provided at one end of the hinge rod 191 may be moved upward so that the height thereof is matched with the height of the glass panel transfer paths 150 at the positions corresponding to the distance between the glass panel transfer paths 150, thereby reducing the distance between the glass panel transfer paths 150. Thus, an overturn of the glass panel G can be prevented while the glass panel G is transferred through the adhesion part 171.

At the bottoms of the feeding conveyer 110 and the transfer conveyer 130 and the rear ends of the glass panel transfer paths 150, a plurality of rear surface support guide rollers 195 and 197 are rotatably installed, which have a predetermined height difference therebetween and maintain a predetermined distance therebetween. The plurality of rear surface support guide rollers 195 are arranged at a higher position than the plurality of rear surface support guide rollers 197, that is, at the bottoms of the feeding conveyer 110 and the transfer conveyer 130. The plurality of rear surface support guide rollers 197 are arranged immediately at the rear ends of the glass panel transfer paths 150 at lower positions than the plurality of rear surface support guide rollers 195.

Therefore, the plurality of rear surface support guide rollers 195 and 197 may assist smooth transfer of the glass panel G while supporting the lower portion of the rear surface of the glass panel G through contact with the lower portion thereof.

Figure 3:
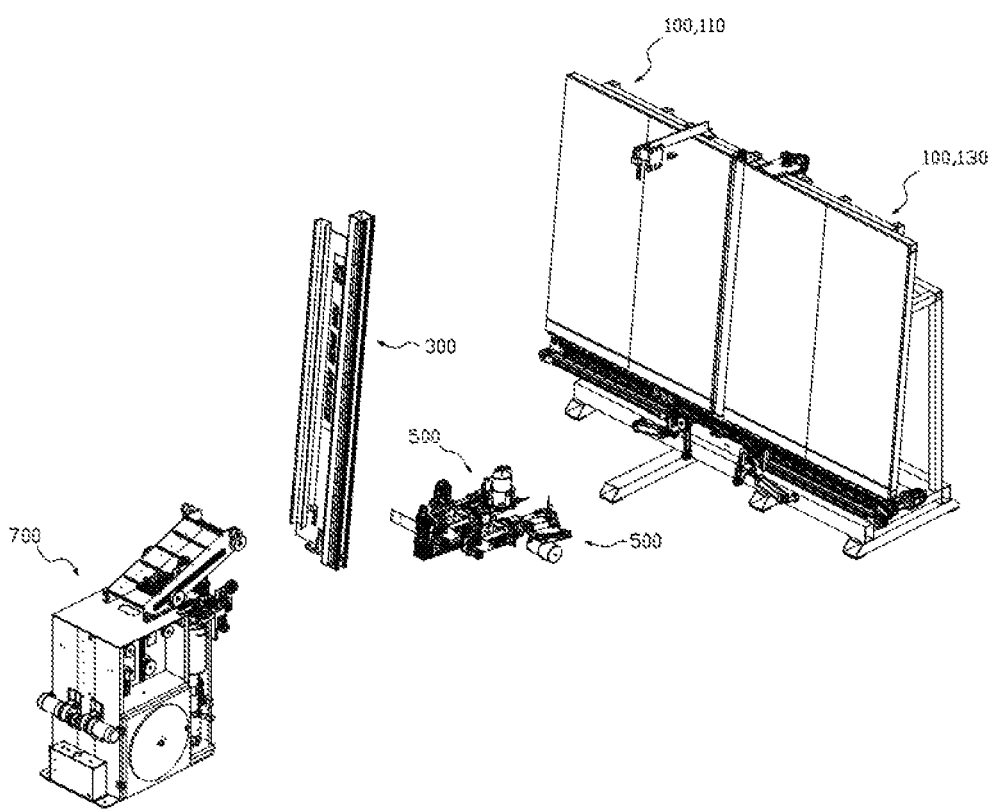
FIG. 3 is a 3D expanded view illustrating a conveyer unit, a foam head unit and a magazine unit which constitute the foam spacer applicator in accordance with the embodiment of the present disclosure.
Figure 6:
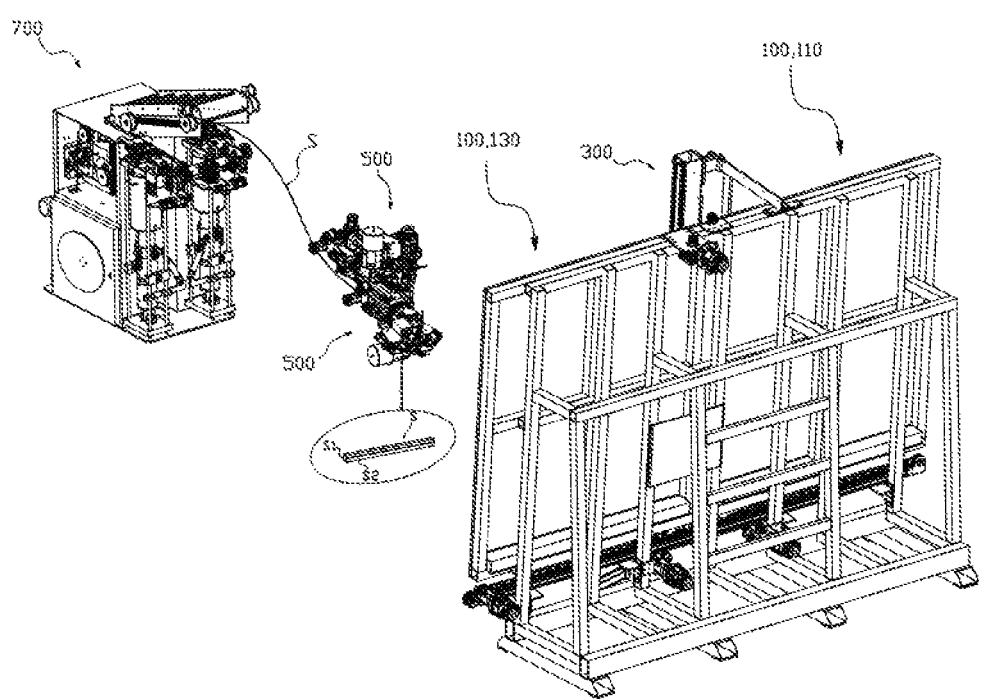
FIG. 6 is a 3D exploded view illustrating the conveyer unit, the foam head unit and the magazine unit which constitute the foam spacer applicator in accordance with the embodiment of the present disclosure, when seen in another direction, and showing a path of a spacer.
Figure 9:
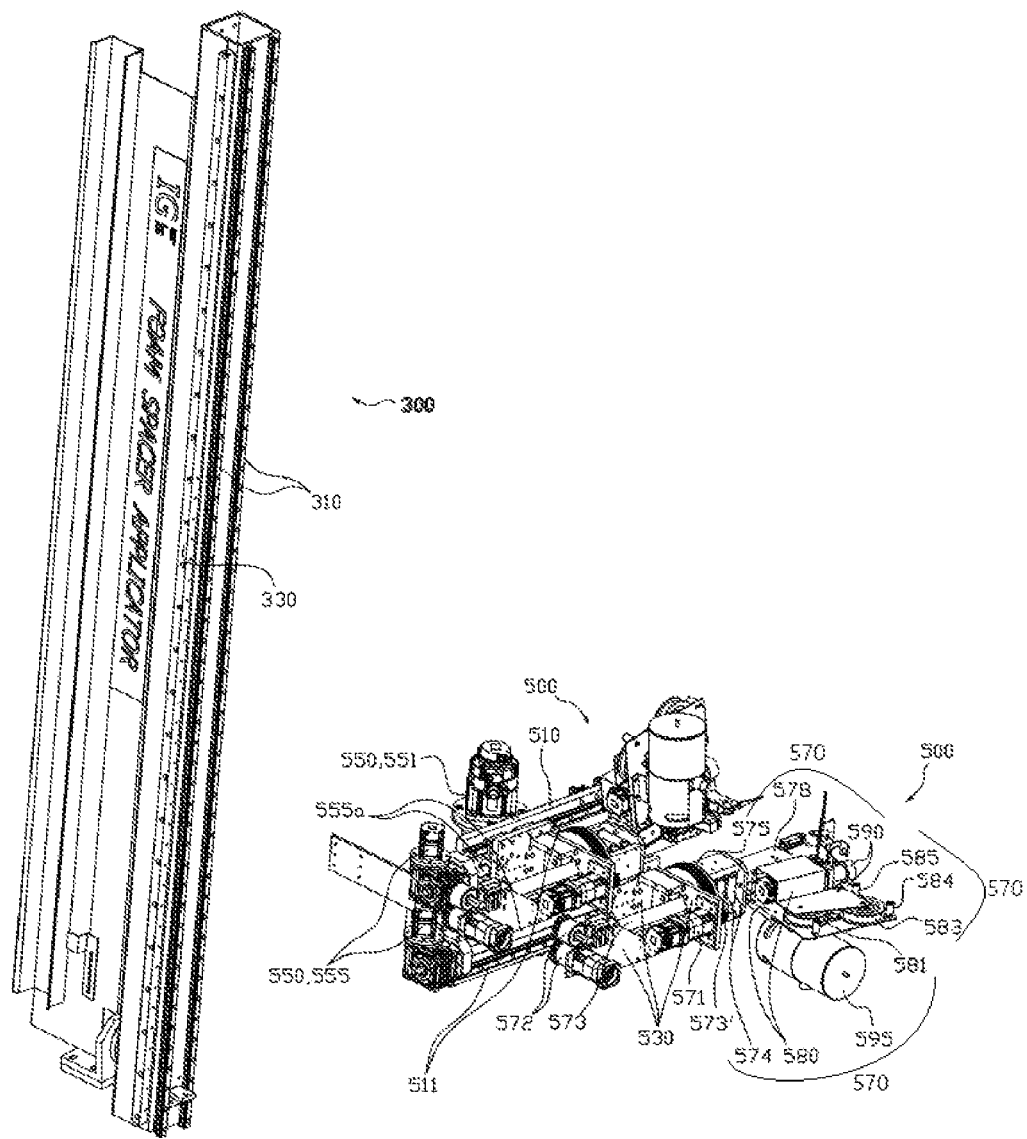
FIG. 9 is a 3D exploded view illustrating the foam head unit and an elevation guide plate.
Figure 10:
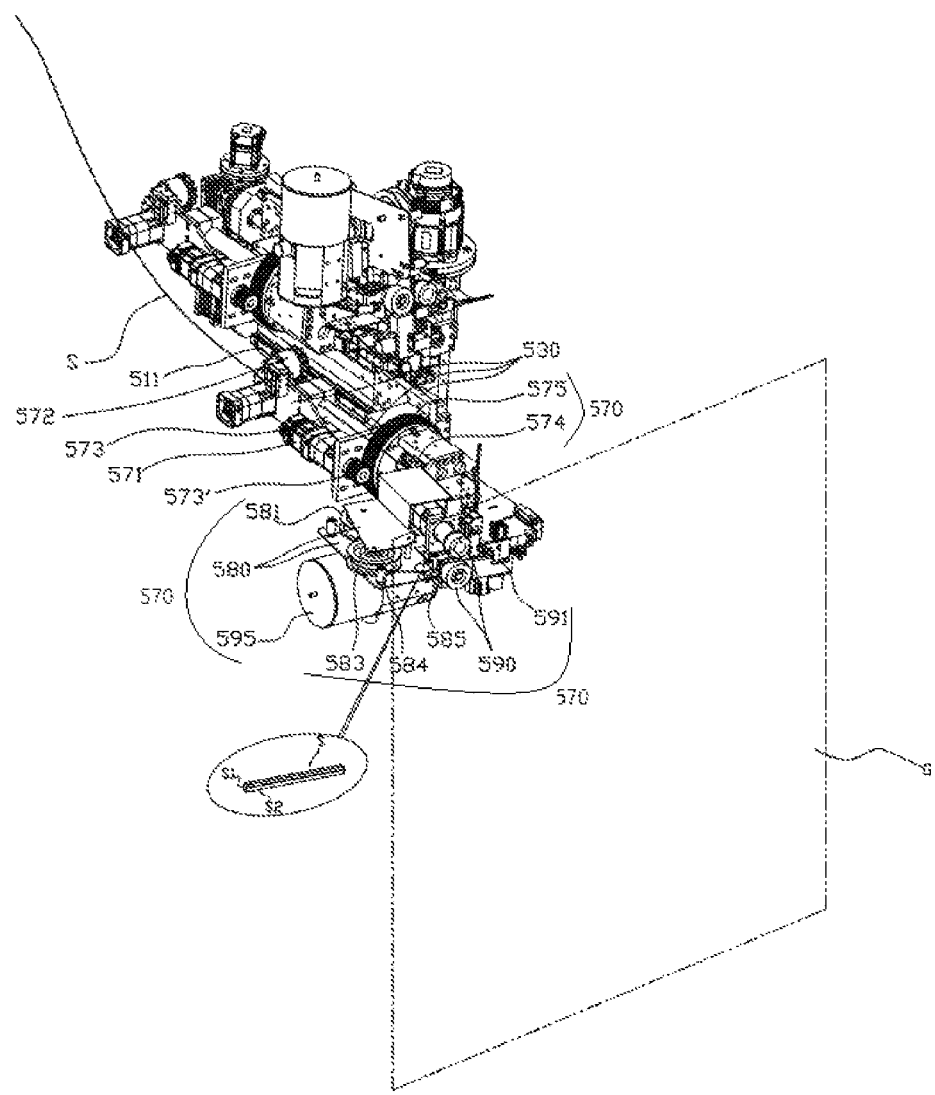
FIG. 10 is an expanded view illustrating the foam head unit illustrated in FIG. 6.
Figure 11:
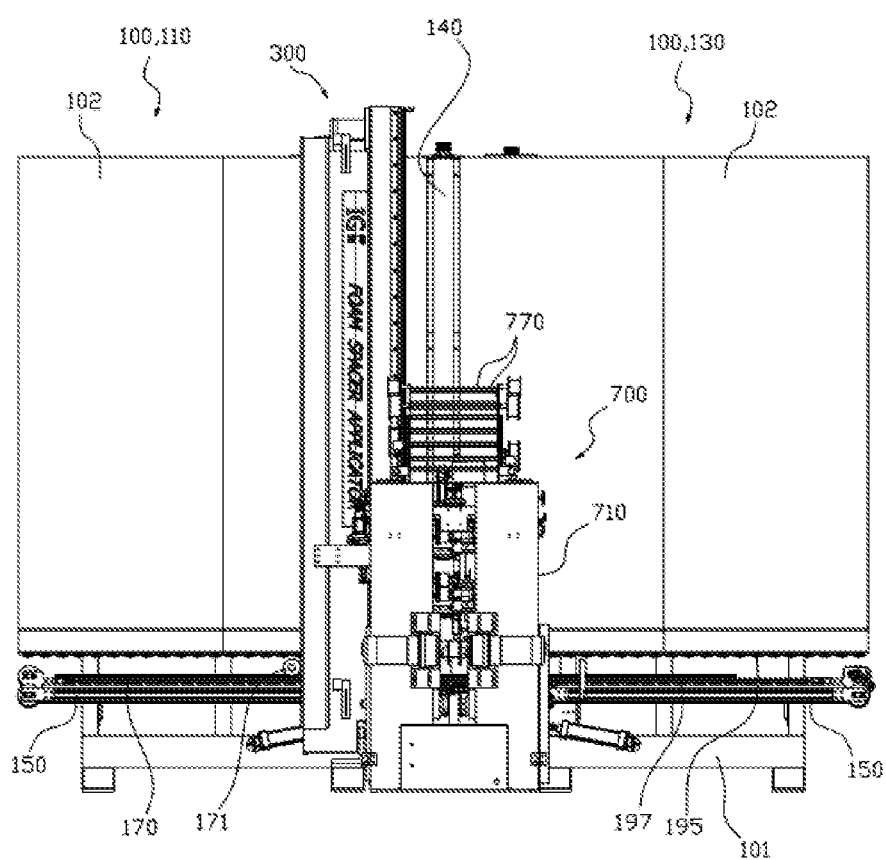
FIG. 11 is a front view illustrating the foam spacer applicator in accordance with the embodiment of the present disclosure.
Figure 12:
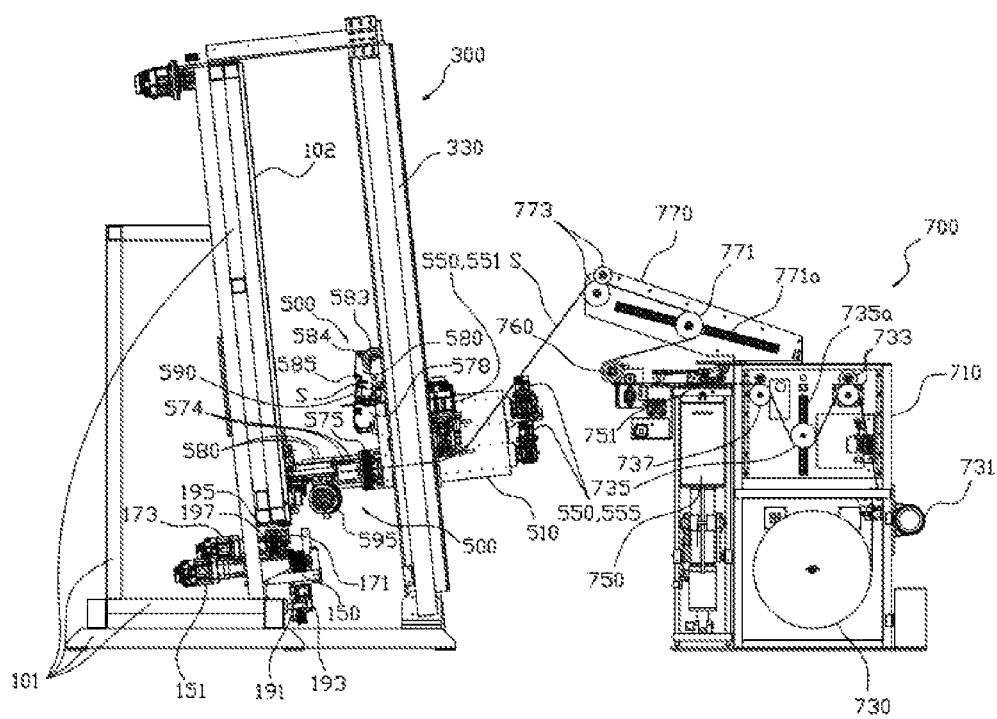
FIG. 12 is a side view illustrating the foam spacer applicator in accordance with the embodiment of the present disclosure, when seen from one side.
Figure 13:
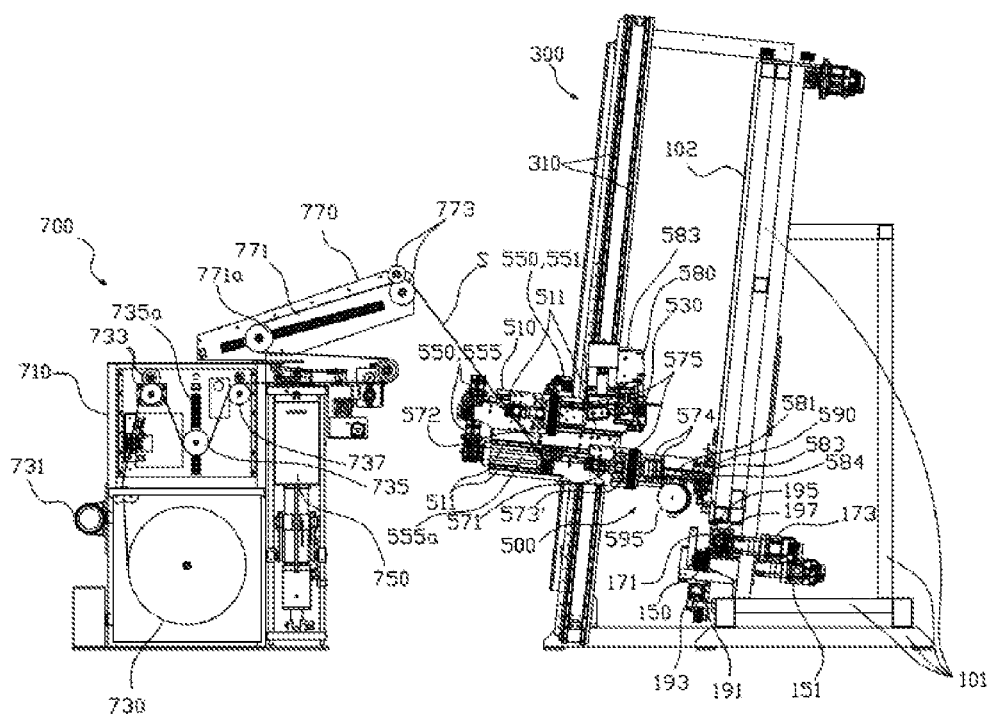
FIG. 13 is a side view illustrating the foam spacer applicator in accordance with the embodiment of the present disclosure, when seen from the other side.
Figure 14:
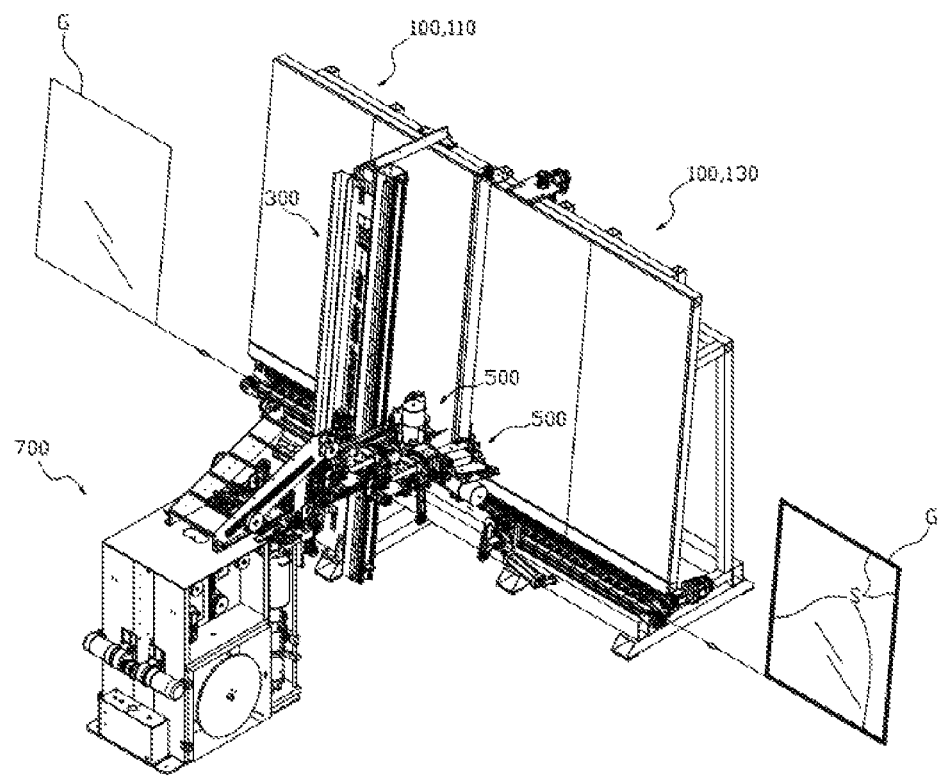
FIG. 14 is a 3D view illustrating the foam spacer applicator in accordance with the embodiment of the present disclosure, when seen from one side, and showing that a glass panel is introduced into a feeding conveyer of the conveyer unit, and the spacer is bonded to the glass panel while the glass panel is transferred to a transfer conveyer.
Figure 15:
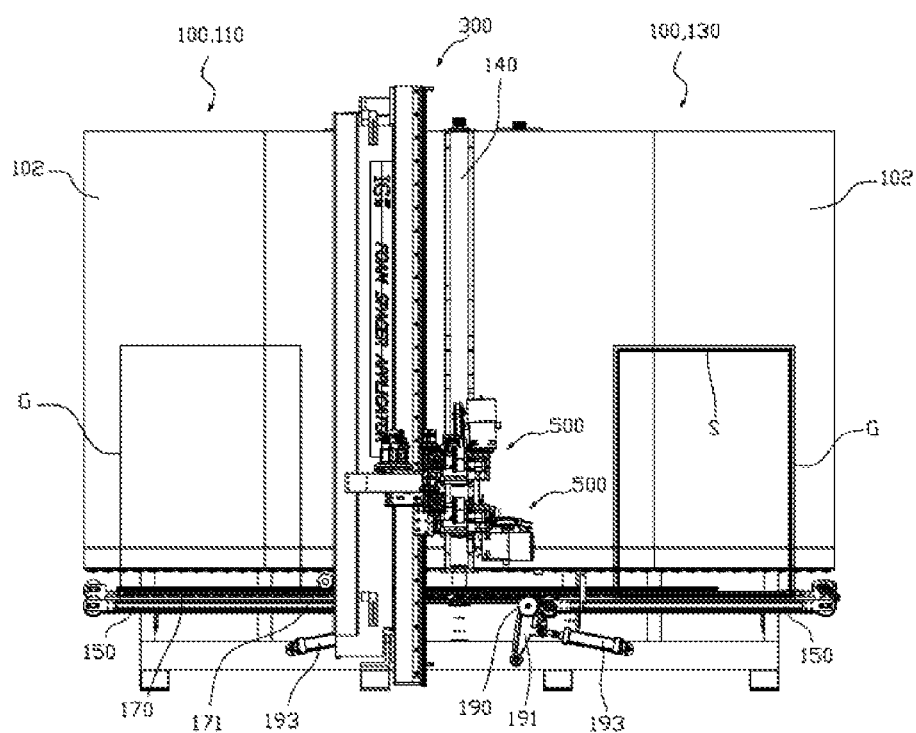
FIG. 15 is a front view illustrating the foam spacer applicator in accordance with the embodiment of the present disclosure, and showing that the glass panel is introduced into the feeding conveyer of the conveyer unit, and the spacer is bonded to the glass panel while the glass panel is transferred to the transfer conveyer.

As illustrated in FIGS. 9 and 10 with reference to FIGS. 3 and 6, the foam head unit 500 may bond the spacer S to the edge of the front surface of the glass panel G transferred between the feeding conveyer 110 and the transfer conveyer 130 by a combination of the X-axis horizontal sliding operation and the Y-axis operation performed through the elevation guide plate 300 vertically disposed with a predetermined distance from the front side of the conveyer unit.

At this time, since only the Y-axis and X-axis operations are performed, the foam head unit 500 needs to move the glass panel G by adjusting the movement of the adhesion part 171, in order to bond the spacer S to the glass panel G in the horizontal direction.

The foam head unit 500 may include one pair of two sets of X-axis rails 511 which are horizontally installed at one surface of an elevation plate 510 moved upward/downward in the elevation guide plate 300, while maintaining a predetermined vertical distance therebetween. That is, four X-axis rails 511 may be installed to constitute one pair of two sets, and each pair of X-axis rails 511 may be engaged with an X-axis moving structure 530 which can be moved forward/backward.

The elevation plate 510 may include a Y-axis power motor 551 which is mounted on the other surface thereof as a power unit 550 configured to provide power for moving the elevation plate 510 upward/downward along the elevation guide plate 300, and a roller 553 which is engaged and rotated with a gear coupled to a shaft of the Y-axis power motor 551 may be moved upward/downward along a guide path 330 formed on a side surface of the elevation guide plate 300.

The elevation guide plate 300 has a pair of guides 310 as well as the guide path 330, and the pair of guides 310 are engaged with the other surface of the elevation plate 510.

Therefore, the elevation plate 510 engaged with the pair of guides 310 may be moved upward/downward in the elevation guide plate 300 through the rotation of the roller 553 which is guided along the guide path 330 by the power provided from the Y-axis power motor 551.

The elevation plate 510 is engaged with the plurality of X-axis moving structures 530 which can be moved forward to/backward from one set of X-axis rails 511, respectively. For example, two X-axis moving structures 530 may be installed.

In order to provide power required for the forward/backward movement operations of the respective X-axis moving structures 530, X-axis power motors 555 may be installed at the rear end of the elevation plate 510 as the power units 550 disposed at a predetermined distance therebetween in the vertical direction. Furthermore, guide rods 555a are coupled to shafts of the respective X-axis power motors 555 and horizontally formed in an elongated shape so as to rotate.

Therefore, as the upper and lower portions of the other surfaces of the X-axis moving structures 530 are engaged with the pair of two sets of X-axis rails 511, respectively, and the central portions of the other surfaces of the X-axis moving structures 530 are screwed to the guide rods 555a, respectively, the X-axis moving structures 530 may be moved forward/backward on the one surface of the elevation plate 510 disposed in the vertical direction by powers provided from the respective X-axis power motors 555.

Each of the X-axis moving structures 530 has one lump structure in which a foam assembly 570 illustrated in FIGS. 9 and 10 is combined. The foam assemblies 570 may be installed in the respective X-axis moving structures 530, and thus constitute a pair of symmetrical structures. Therefore, since the components installed in the pair of foam assemblies have the same structures and perform the same functions, only the components installed in any one of the pair of foam assemblies 570 will be described in detail, and the descriptions of the components of the other foam assembly 570 will be omitted herein.

Each of the X-axis moving structures 530 may include a rotation power motor 571 disposed at the rear end thereof, a pair of feeding rollers 572 installed at the top and bottom on a side of the rotation power motor and configured to feed the spacer S while rotated through power provided from the rotation power motor, and an inlet pipe 573 extended horizontally toward the front side of the feeding rollers and configured to receive the spacer S therein.

As illustrated in FIGS. 9 and 10, the foam assembly 570 may include a ring gear 575, a plurality of zigzag guide rolls 574, a plate 578, a cylinder (not illustrated), an open case 580, a turning inducement roller 581, a turning roller 583, a track separation prevention roller 584, a bonding roller 585, a pair of drawing rollers 590, a cutting point 591, a cutter blade (not illustrated), and a collection box 595. The ring gear 575 may be rotatably installed at the front end of the inlet pipe, and have a larger inner diameter than the diameter of the inlet pipe. The plurality of zigzag guide rolls 574 may be arranged with a vertical structure at the front of the ring gear, and serve to guide the spacer S in a zigzag manner. The plate 578 may be installed at the front of the zigzag guide rolls. The cylinder may be coupled to the bottom of the plate. The open case 580 may be disposed beside the plate 578 at the front of the zigzag guide rolls. The turning inducement roller 581 may be rotatably installed in the open case and induce the spacer S to turn the direction. The turning roller 583 may be installed at the front of the turn inducement roller while maintaining a predetermined distance from the turning inducement roller, and decide whether to turn the direction of the spacer S. The track separation prevention roller 584 may be located at the front of the turning roller while maintaining a predetermined distance from the turning roller, and serve to prevent track separation of the spacer S. The bonding roller 585 may be located beside the track separation prevention roller so as to be disposed ahead of the track separation prevention roller, while maintaining a predetermined distance from the track separation prevention roller, and serve to bond the spacer S along the edge of the glass panel G. The pair of drawing rollers 590 may be located beside the bonding roller so as to be disposed behind the bonding roller, while maintaining a predetermined distance from the bonding roller, and serve to draw the spacer S. The cutting point 591 may be formed in a space beside the drawing roller while maintaining a predetermined distance from the drawing roller, and set to a cutting point of the spacer S. The cutter blade may be installed at the cutting point, and serve to cut a part of the spacer S as a rod is moved forward by an operation of the cylinder (not illustrated). The collection box 595 may be disposed under the open case and serve to suction and collect cut pieces which occur during the cutting process of the spacer S.

A gear 573' coupled to the shaft of the rotation power motor 571 may be engaged with the ring gear 575. As the gear 573' is rotated by power of the rotation power motor 571, the ring gear 575 may also be rotated. Through the rotation of the ring gear 575, the spacer S may be bonded while the bonding angle of the spacer S passed through the bonding roller 585 is rotated at an edge corner of the glass panel G.

In other words, as the ring gear 575 engaged with the gear 573' is rotated, the foam assembly 570 including the zigzag guide rolls 574, the plate 578, the open case 580, the turning inducement roller 581, the turning roller 583, the track separation prevention roller 584, the bonding roller 585, the drawing rollers 590, the cutting point 591 and the collection box 595 may be rotated at an angle of 90° or more. Thus, as the bonding angle of the spacer S passed through the bonding roller 585 is rotated at the edge corner of the front surface of the glass panel G, the spacer S may be bonded.

The magazine unit 700 disposed at a predetermined distance from the rear side of the foam head unit may serve to inject and apply a sealant to both side surfaces S1 and S2 of the spacer S while adjusting tension of the spacer S, and then supply the spacer S to the foam head unit.

Figure 7:
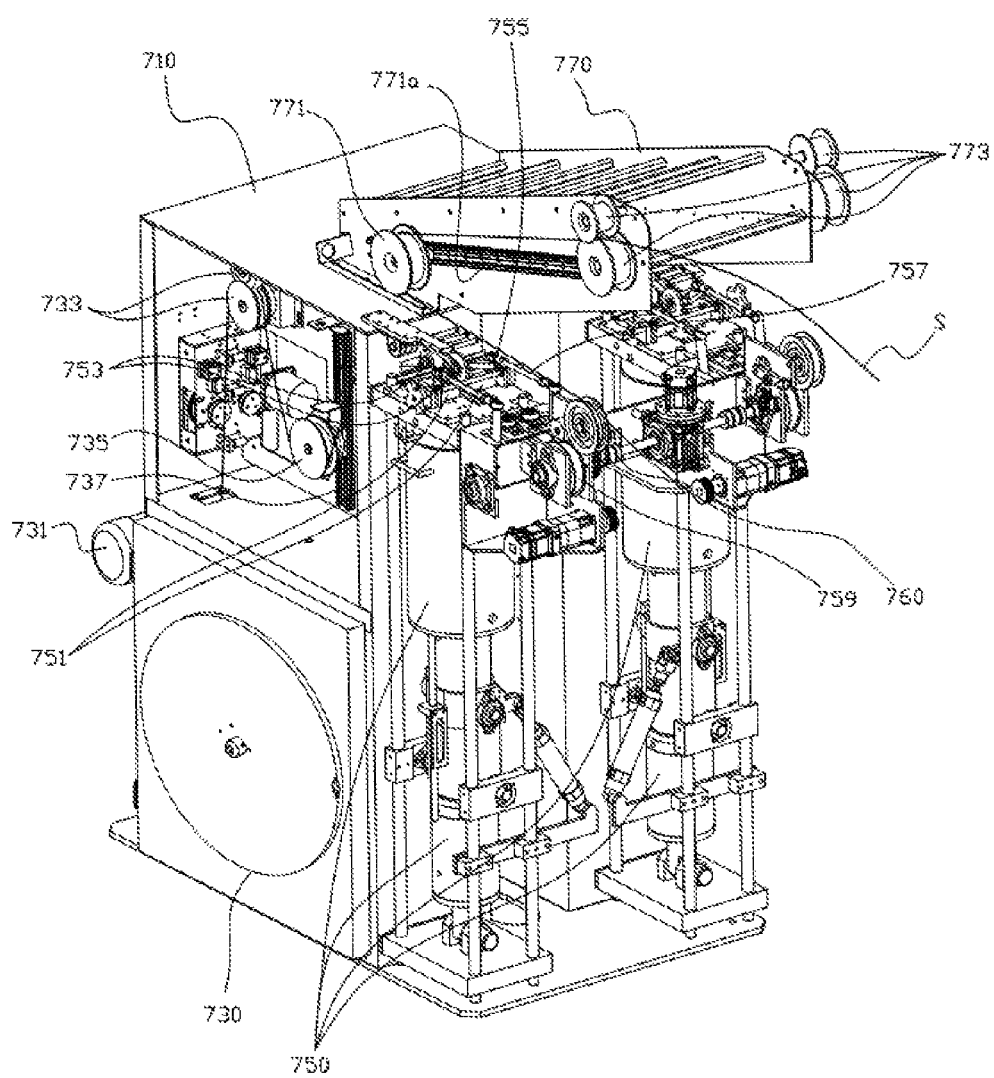
FIG. 7 is an expanded view illustrating the magazine unit illustrated in FIG. 6.
Figure 8:
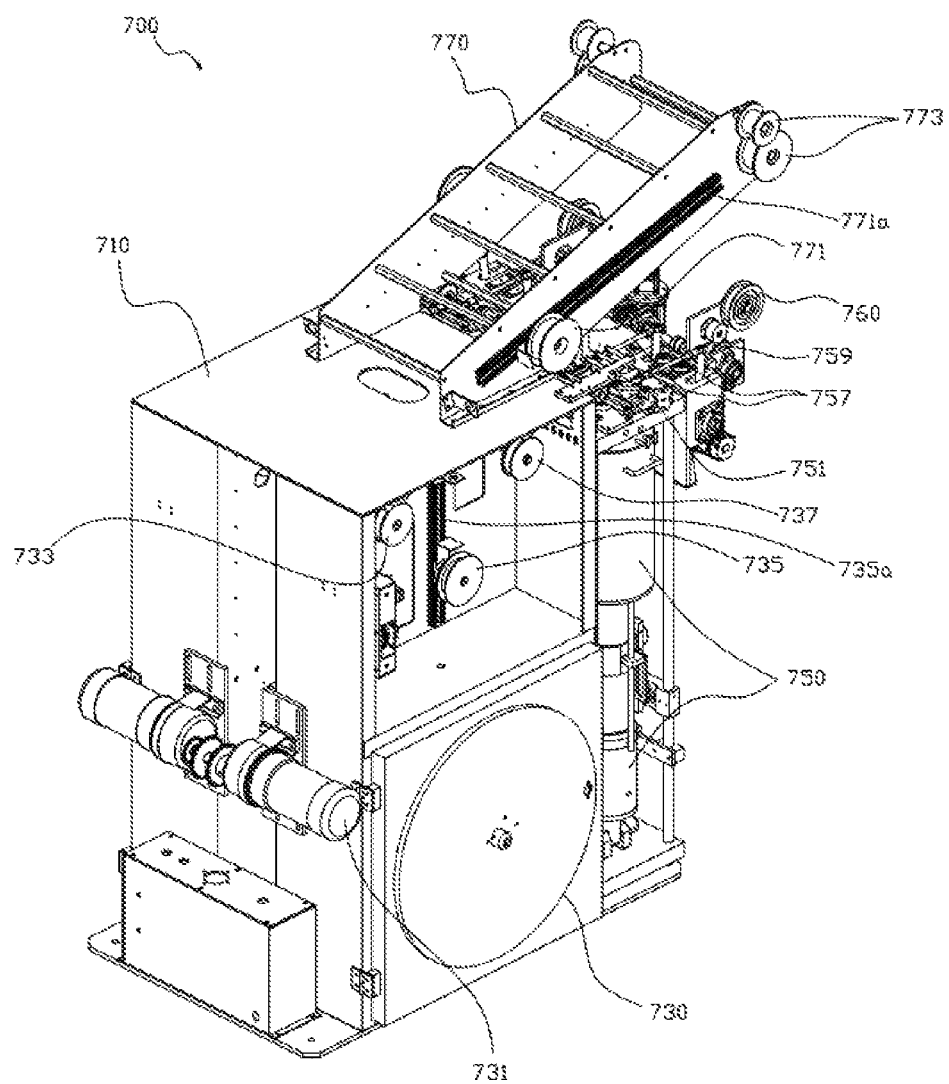
FIG. 8 is an expanded view illustrating the magazine unit illustrated in FIG. 7, when seen in another direction.

As illustrated in FIGS. 7 and 8 with reference to FIG. 6, the magazine unit 700 may include a winding roll 730, a rotation power motor 731, a pair of first guide rolls 733, a tension adjusting roller 735 and a pair of second guide rolls 737. The winding roll 730 may be rotatably installed at each of the inner left and right sides of a box-shaped plate 710 which has a compartmented structure while forming the exterior of the magazine unit 700, and serve to unwind the wound spacer S. The rotation power motor 731 may provide rotation power to the winding roll. The pair of first guide rolls 733, the tension adjusting roller 735 and the pair of second guide rolls 737 may be disposed with an inverted triangle structure in a compartmented area above the winding roll 730, and then rotated.

The magazine unit 700 may further include a pair of coating pressure parts 750, a pair of injection blocks 751, a first direction turning roll 753, a track separation prevention roller rod 755, an open range adjusting rod 757 and an unloading roll 759. The pair of coating pressure parts 750 may be installed at the front of the winding roll, that is, outside the front end of the magazine unit 700. The pair of injection blocks 751 may be located above the respective coating pressure parts and disposed at a predetermined distance from each other so as to face each other. The first direction turning roll 753 may be located between the injection blocks so as to be disposed at a higher position than the injection blocks, and serve to decide the direction of the spacer S. The track separation prevention roller rod 755 may be located at the front of the first direction turning roll, and serve to prevent track separation of the spacer S whose turning direction is decided. The open range adjusting rod 757 may have one end hinged to the upper ends of the injection blocks facing each other and the other end hinged to a connection rod extend from a shaft of a power motor, and serve to adjust the coating opening range of the sealant while moved forward/backed by power of the power motor. The unloading roll 759 may be located at the front of the open range adjusting rod and serve to unload the spacer S.

The magazine unit 700 may further include a tension adjusting structure 770 which can adjust tension while deciding the direction of the spacer S unloaded through the unloading roll. The tension adjusting structure 770 may be mounted on the top of the magazine unit 700, and inclined toward the foam head unit.

The magazine unit 700 may further include a rail 771a formed on either side of the tension adjusting structure 770 in the longitudinal direction of the tension adjusting structure 770, a tension adjusting roller 771 installed on the rail 771a and serving to adjust the tension of the spacer S in a sliding manner, and a pair of ending supply rolls 773 located at the front end of the tension adjusting structure 770 and serving to supply the spacer S to the foam head unit 500.

The operation process of the foam spacer applicator in accordance with the embodiment of the present disclosure will be described below in detail. The operation process will be described with reference to FIGS. 16 to 24 based on FIGS. 1 to 15.

When a glass panel G is introduced into the feeding conveyer 110 along the glass panel transfer path 150 of the conveyer unit 100 and arrives at the long roller 140 between the feeding conveyer 110 and the transfer conveyer 130 immediately before the transfer conveyer 130, the foam head unit 500 is moved upward or downward according to the top height of the glass panel G through the elevation guide plate 300 disposed with a vertical structure on the front side of the conveyer unit 100.

Then, any one of the pair of X-axis moving structures 530 on the elevation plate 510 installed in the foam head unit 500 is moved forward and slid to approach a top corner (edge) of the glass panel G, for example, a top right corner.

At this time, as the X-axis moving structure 530 approaches the top right corner of the glass panel G, the spacer S may be pressed toward the right top corner of the glass panel G and bonded to the glass panel G, while passed through the bonding roller 585 corresponding to the front end of the foam assembly 570 combined with the X-axis moving structure 530.

Figure 16:
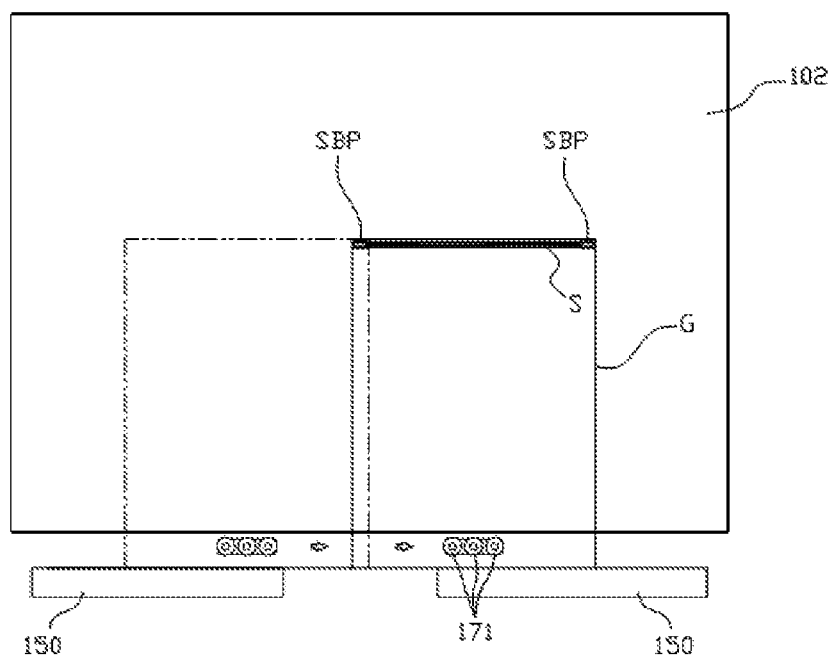
FIGS. 16 to 23 are views sequentially illustrating a process of bonding the spacer across the edge of the front surface of the glass panel through the foam spacer applicator in accordance with the embodiment of the present disclosure.
Figure 17:
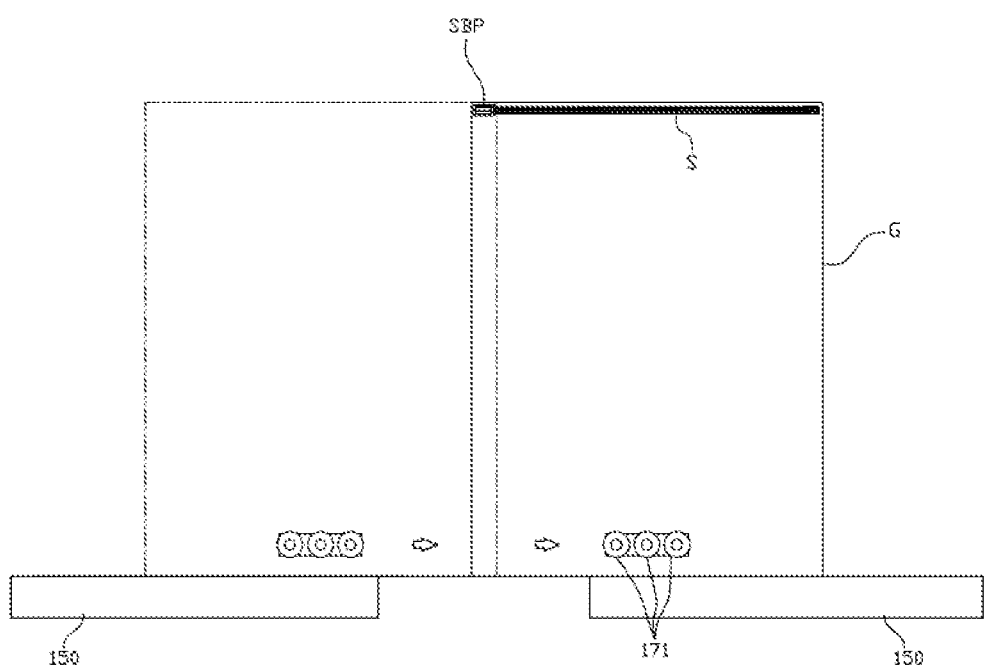

At this time, while the adhesion part 171 adhering to the lower portion of the rear surface of the glass panel G is moved to the right, for example, the glass panel G may also be moved together at the same time. While the glass panel G is moved to the right, the spacer S bonded to the top right corner of the glass panel G may be bonded up to the top left corner of the glass panel G. This process is illustrated in FIGS. 16 and 17, and SBP (Spacer Bonding Point) in FIGS. 16 to 23 represents a bonding point of the spacer. FIGS. 16 to 23 conceptually illustrate that, as the foam assembly 570 is rotated at an angle of 90° or more at an edge corner of the front surface of the glass panel G, the spacer bonding point SBP of the spacer is rotated at an angle of 90° or more by the rotation of the foam assembly 570.

Figure 24:
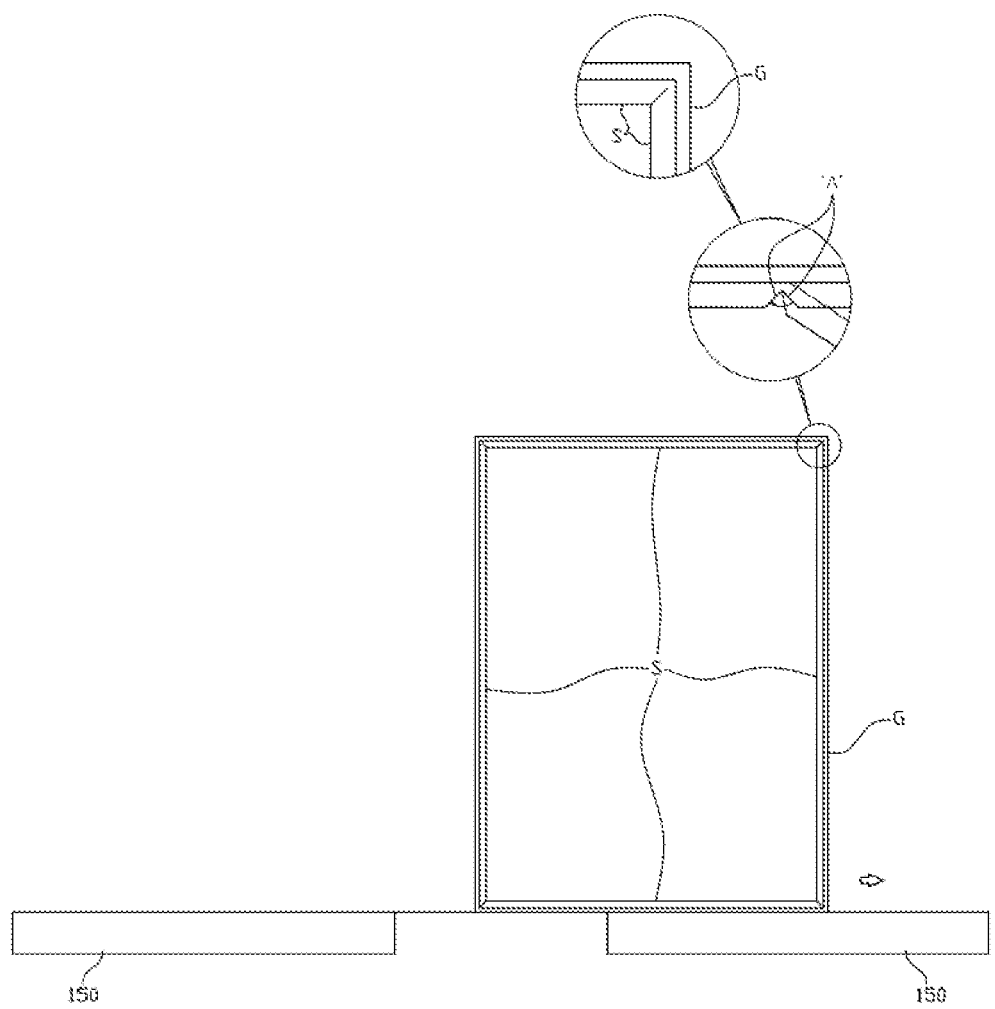
FIG. 24 is a view illustrating that the spacer is bonded across the edge of the front surface of the glass panel through the foam spacer applicator in accordance with the embodiment of the present disclosure, and showing the corners of the spacer, i.e. the cutting shape of a bent portion of the spacer.

During a bonding process in which the spacer S is transferred to the top left corner of the glass panel G, a part of the spacer S may be cut in an L-shape with an inclined angle of 90° or more at the cutting point 591 through the cutter blade (not illustrated) which is moved forward by power of the cylinder. The partial cut structure of the spacer S serves to induce the corner bonding angle of the spacer S to be bent by 90° at the top left corner of the glass panel G through the rotation of the foam assembly 570. The spacer S may be cut in the L-shape as illustrated in FIG. 24, and thus bent in a square shape (with an angle of 90° or more), not a curved shape.

Therefore, the foam assembly 570 may be rotated at an angle of 90° as the ring gear 575 is rotated together with the rotation of the gear 573' by the power provided from the rotation power motor 571. Thus, the spacer S bonded to the top left corner of the glass panel G may be bent at an angle of 90° through the L-shaped partial cut structure.

Figure 18:
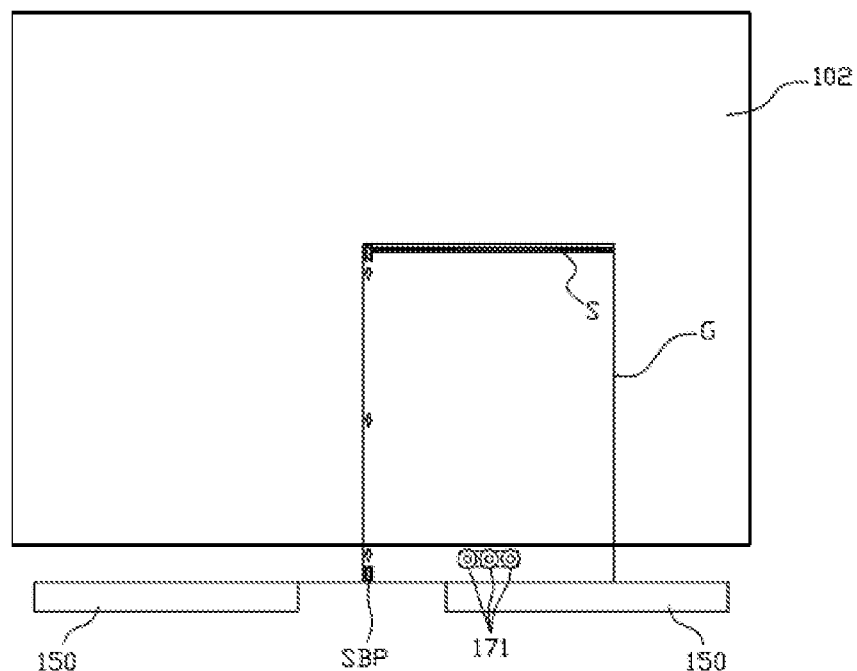
Figure 19:
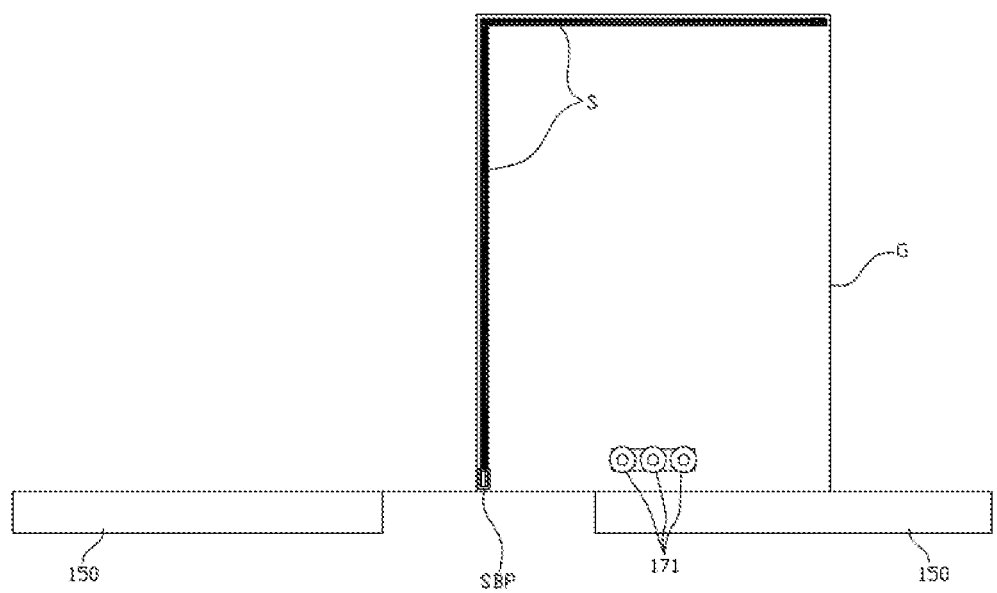

When the elevation plate 510 is moved downward along the elevation guide plate 300 with the spacer S bent at an angle of 90° in the top left corner, the foam assembly 570 may also be moved downward at the same time. During this process, the spacer S may be bonded up to the bottom left corner of the glass panel G. This process is illustrated in FIGS. 18 and 19.

Figure 20:
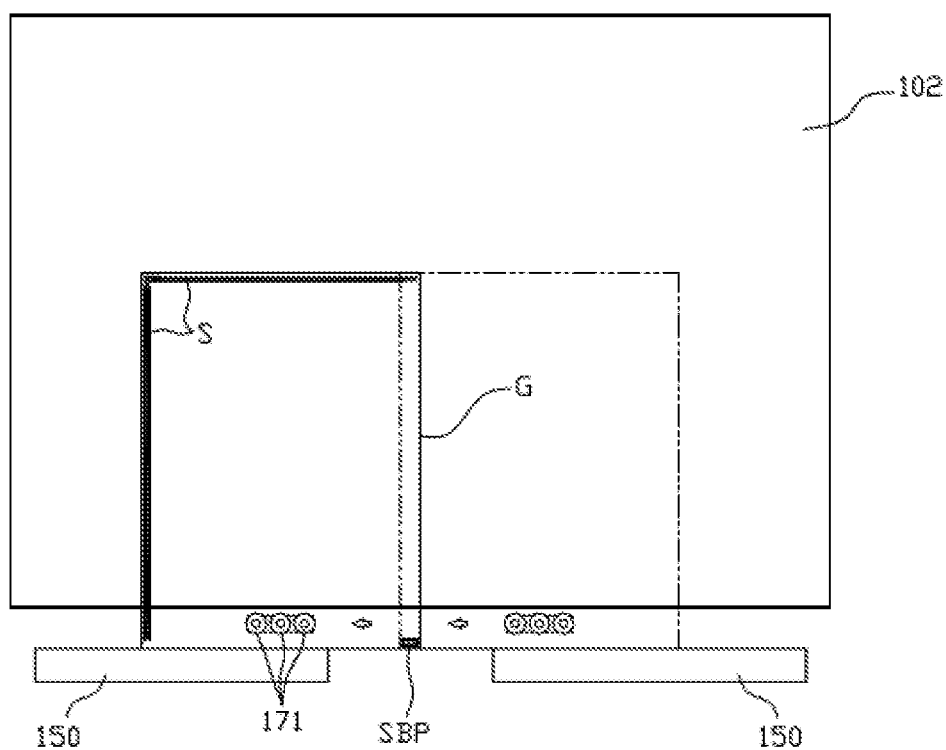

When the spacer S is bonded up to the bottom left corner of the glass panel G, a part of the spacer S is chamfered and cut again in an L-shape by the cutter blade (not illustrated), and the foam assembly 570 is rotated again at an angle of 90° through the rotations of the gear 573' and the ring gear 575 which are rotated by the power provided from the rotation power motor 731. At this time, the spacer S is also bent at an angle of 90° through the L-shaped partial cut structure in the bottom left corner of the glass panel G, as illustrated in FIG. 20.

Figure 21:
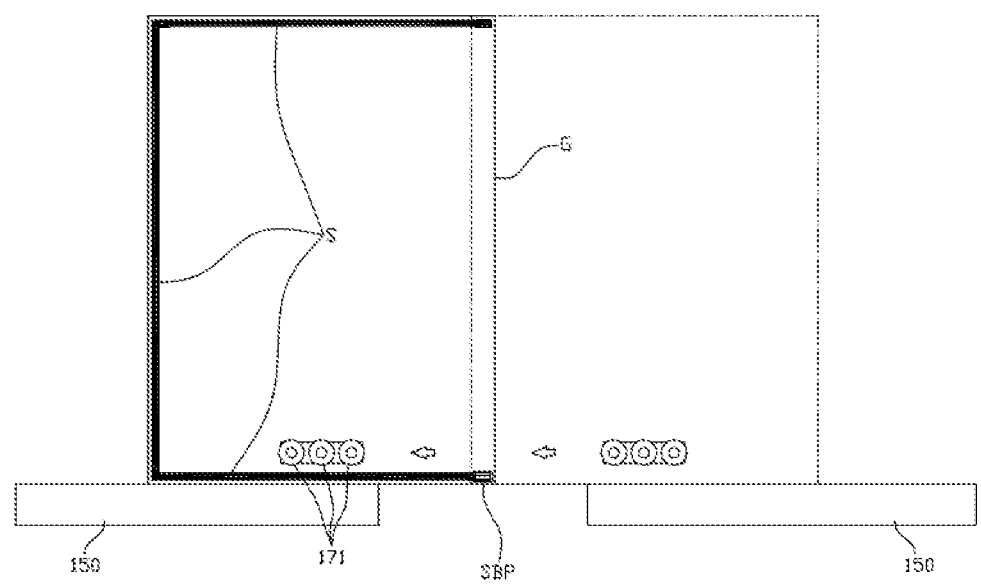
Figure 22:
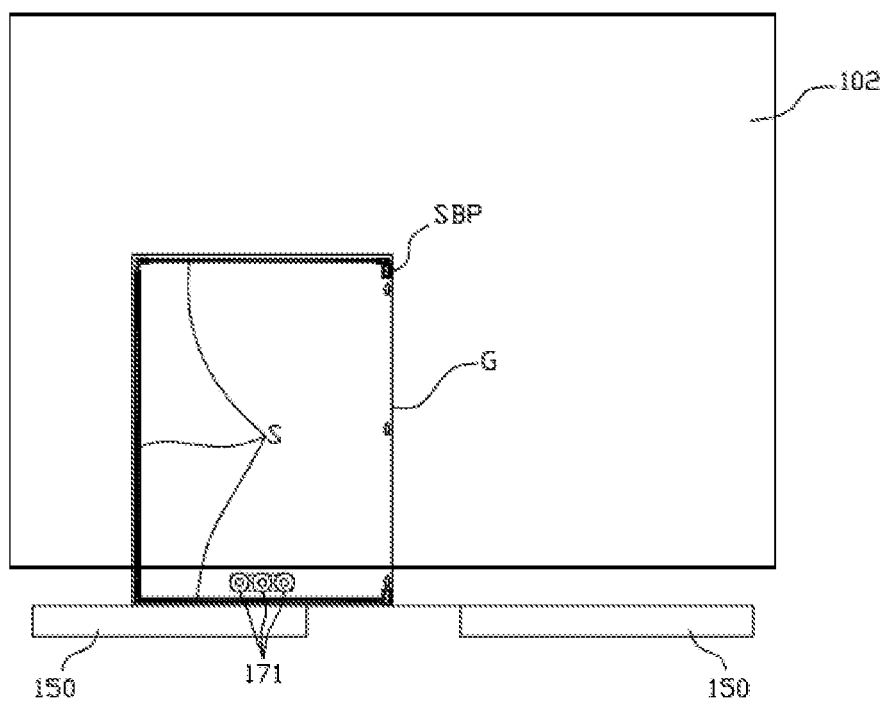

Then, the glass panel G may be returned to the original position through reverse movement of the adhesion part 171 to the left. During this process, the spacer S may be bonded up to the bottom right corner of the glass panel G, as illustrated in FIGS. 21 and 22.

When the spacer S is bonded up to the bottom left corner of the glass panel G, a part of the spacer S is chamfered and cut again in an L-shape by the cutter blade (not illustrated), and the foam assembly 570 is rotated at an angle of 90° through the rotations of the gear 573' and the ring gear 575 which are rotated by the power provided from the rotation power motor 731. At this time, the spacer S is also bent at an angle of 90° through the L-shaped partial cut structure in the bottom right corner of the glass panel G.

Figure 23:
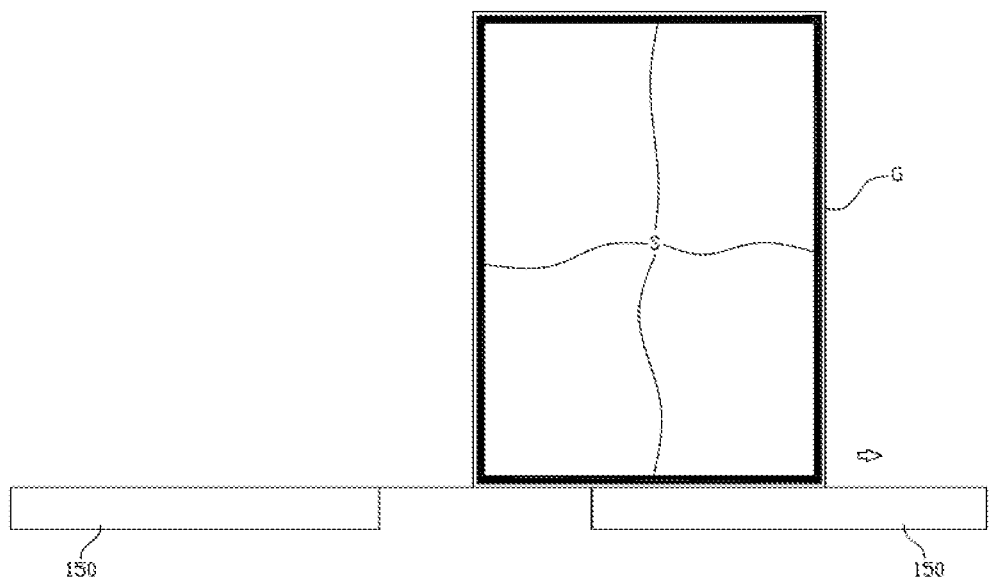

When the elevation plate 510 is moved upward along the elevation guide plate 300 with the spacer S bent at an angle of 90° in the bottom right corner, the foam assembly 570 may also be moved upward at the same time. During this process, the spacer S may be bonded up to the top right corner of the glass panel G, as illustrated in FIGS. 22 and 23.

As described above, when the spacer S is completely bonded to the corners of the front surface of the glass panel G, the glass panel G may be transferred to the transfer conveyer 130 through the glass panel transfer path 150 by means of the movement of the adhesion part 171 and the rotation of the long roller 140. Then, the glass panel G may be transferred from the transfer conveyer 130 to another facility line.

Since the foam spacer applicator includes the pair of foam assemblies 570, any one foam assembly 570 may perform an operation of bonding the spacer S along the corners of the front surface of the glass panel G, and the other foam assembly 570 may wait during the bonding operation of the one foam assembly 570, and then perform an operation of bonding the spacer S along the corners of the front surface of another glass panel G fed after the glass panel G. That is, the pair of foam assemblies 570 may be alternately operated for the operation of bonding the spacer S, which makes it possible to expect high efficiency of the operation of bonding the spacer S.

The reason why the spacer S can be bonded to the corners of the front surface of the glass panel G is because the sealant is injected from the injection block 751 installed in the magazine unit 700 to be described below and applied to both surfaces S1 and S2 of the spacer S.

As the sealant, polyisobutylene resin may be preferably used, but the material for the sealant is not limited thereto. Furthermore, the spacer S may be made of a composite material in which aluminum and butyl rubber are mixed. However, the material for the spacer S is not limited thereto, but it may be construed that the examples of the material for the spacer S includes another composite material in which other materials are mixed.

Therefore, when an insulated glass unit is finalized as a product, the spacer S may be bonded along the edges of the glass panels, and a space (air layer) between the glass panels, which is filled with gas, may be formed by the bonding of the spacer S.

The spacer S may be bonded to the corners of the front surface of the glass panel G through the process in which the spacer S is supplied from the magazine unit 700 and passed through the foam head unit 500. The process in which the spacer S is supplied and passed will be described below.

While the spacer S unwound through the winding roll 730 of the magazine unit 700 is passed through the tension adjusting roller 735 via the first guide roll 733 located above the winding roll 730, passed through the second guide roll 737, and passed between the injection blocks 751 disposed over the coating pressure parts 750 so as to face each other, the sealant is injected from nozzles formed in the injection blocks 751 and applied onto both surfaces S1 and S2 of the spacer S. As the coating pressure parts 750, various types of parts can be used as long as they not only serves as a container for storing the sealant therein, but also can pressurize and supply the sealant toward the nozzles of the injection blocks 751.

At this time, the first direction turning roll 753 located above between the injection blocks 751 may restrict the direction of the spacer S which may be moved upward by the elastic force of the spacer S coming out of the second guide roll 737 installed in the magazine unit 700 to the outside of the magazine unit 700, and thus induce the spacer S to pass between the injection blocks 751. The foam spacer applicator may include the plurality of first direction turning rolls 753 disposed at a predetermined distance therebetween in the front-to-rear direction.

The spacer S having passed through the injection blocks 781 is transferred while the direction thereof is restricted again by the track separation prevention roller rod 755. Then, the spacer S is unloaded through the unloading roll 759 located in front of the track separation prevention roller rod 755, and simultaneously turned in the reverse direction by the second direction turning roll 760 located immediately in front of the unloading roll.

The spacer S turned in the reverse direction by the second direction turning roll 760 may be supplied to the foam head unit 500 through the ending supply roll 773, while the tension thereof is adjusted through the tension adjusting roller 771 of the tension adjusting structure 770 mounted on the top of the magazine unit 700. At this time, the tension adjusting roller 771 may automatically adjust the tension of the spacer S while slid along the rail 771*a*.

The foam head unit 500 feeds the spacer S introduced through the ending supply roll 773 to the feeding roller 572. During this process, the spacer S is introduced into the inlet pipe 573 at the rear end of the inlet pipe 573, and introduced between the zigzag guide rolls 574, which will be described below, through the front end of the inlet pipe 573.

The spacer S coming out of the front end of the inlet pipe 573 may be bonded across the edge of the front surface of the glass panel G by sequentially passing the spacer S through the turning inducement roller 581, the turning roller 583, the track separation prevention roller 584 and the bonding roller 585, through a method of passing the spacer S along the zigzag guide rolls 574 and exposing the spacer S. While the spacer S is bonded across the edge of the front surface of the glass panel G, a part of the spacer S may be cut in an L-shape at an angle of 90° or more at the cutting point 591 by the cutter blade (not illustrated) such that the spacer S can be bent at an angle of 90° in the corresponding corner of the edge of the glass panel G.

Furthermore, cut pieces which occur while a part of the spacer S is cut may be suctioned and collected by the collection box 595 disposed under the open case 580. Examples of the collection box 595 may include a suction fan for forcibly suctioning the cut pieces.

While various embodiments have been described above, it will be understood to those skilled in the art that the embodiments described are by way of example only. Accordingly, the disclosure described herein should not be limited based on the described embodiments.

What is claimed is:

1. An apparatus for application of foam spacer comprising:
   a conveyer unit configured to automatically transfer a glass panel;
   a foam head unit disposed in spaced relation to a front side of the conveyer unit, and configured to automatically supply and bond a spacer to the glass panel transferred from the conveyer unit through a combination of an X-axis horizontal operation and a Y-axis elevation operation through an elevation guide plate disposed with a vertical structure; and
   a magazine unit disposed in spaced relation to a rear side of the foam head unit, and configured to inject and apply a sealant to both surfaces of the spacer while adjusting tension of the spacer, and automatically supply the spacer to the foam head unit,
   wherein the foam head unit comprises:
      a pair of X-axis moving structures moved forward/backward through one set of X-axis rails which are arranged with a horizontal structure and engaged with the X-axis moving structures, at one surface of an elevation plate which is connected as a vertical structure engaged with the elevation guide plate and moved upward/downward;
      power units coupled to the other surface of the elevation plate so as to provide power required for an elevation operation of the elevation plate, and coupled to a rear end of the elevation plate so as to be disposed in spaced relation to each other in a vertical direction and configured to provide power required for the forward/backward operation of the X-axis moving structure; and
      a pair of foam assemblies coupled to the X-axis moving structures through combination with the X-axis moving structures, and configured to perform an operation of bonding the spacer across the edge of a front surface of the glass, wherein the foam assembly further comprises:
      a ring gear rotatably installed at a front end of an inlet pipe, and having a larger inner diameter than the diameter of the inlet pipe;
      a plurality of zigzag guide rolls arranged with a vertical structure at the front of the ring gear, and configured to guide the spacer forward in a zigzag manner;
      a turning inducement roller rotatably installed in an open case disposed beside a plate installed at the front of the zigzag guide rolls, and configured to induce turning a direction of the spacer exposed through the zigzag guide rolls;
      a turning roller located at a front of the turning inducement roller and maintained in spaced relation to the turning inducement roller, and rotatably installed to decide whether to turn the direction of the spacer;
      a track separation prevention roller located at a front of the turning roller and maintained in spaced relation to the turning roller; and configured to prevent track separation of the spacer; and a bonding roller located beside the track separation prevention roller and disposed ahead of and maintained in spaced relation to the track separation prevention roller, and configured to induce and bond the spacer across the edge of the front surface of the glass panel.

2. The apparatus for application of foam spacer of claim 1, further comprising:

a pair of drawing rollers located beside the bonding roller and disposed behind and maintained in spaced relation to the bonding roller, and configured to draw the spacer;

a cutting point configured as a structure for forming a space beside the drawing rollers and maintained in spaced relation to the drawing rollers, and serving as a cutting point of the spacer;

a cylinder installed at the cutting point under the plate installed at the front of the zigzag guide rolls, and configured to provide power required for moving a rod forward; and a cutter blade installed at the cutting point and configured to cut a part of the spacer introduced to the cutting point at an angle of 90° or more by the operation of moving the rod forward using the power of the cylinder.

3. The apparatus for application of foam spacer of claim 2, further comprising a ring gear rotatably installed at the front end of the X-axis moving structure, while surrounding an outer circumference of the front end of the inlet pipe without coming in contact with the front end of the inlet pipe, and configured to rotate the zigzag guide rolls, the turning inducement roller, the turning roller, the track separation prevention roller, and the foam assembly at an angle of 90° or more, the foam assembly including the bonding roller, the drawing rollers, the cutting point, the cylinder and the cutter blade.

4. The apparatus for application of foam spacer of claim 3, further comprising:

a rotation power motor coupled to a portion of the X-axis moving structure corresponding to one side of the ring gear and configured to provide rotation power of the ring gear; and a gear coupled to a shaft of the rotation power motor and engaged with the ring gear.

5. The apparatus for application of foam spacer of claim 3, wherein the foam assembly bends the spacer at an angle of 90° or more, while rotated at an angle of 90° or more in an edge corner of the front surface of the glass panel through the rotation of the ring gear.

6. An apparatus for application of foam spacer comprising:

a conveyer unit configured to automatically transfer a glass panel;

a foam head unit disposed in spaced relation to a front side of the conveyer unit, and configured to automatically supply and bond a spacer to the glass panel transferred from the conveyer unit through a combination of an X-axis horizontal operation and a Y-axis elevation operation through an elevation guide plate disposed with a vertical structure; and a magazine unit disposed in spaced relation to a rear side of the foam head unit, and configured to inject and apply a sealant to both surfaces of the spacer while adjusting tension of the spacer, and automatically supply the spacer to the foam head unit, wherein the magazine unit further comprises:

a pair of winding rolls rotatably installed on both inner sides of a box-shaped plate which has a compartmented structure to form an exterior of the magazine unit, and configured to unwind a wound spacer;

a first guide roll rotatably installed in a compartmented area above the winding roll, and configured to guide the spacer unwound by the winding roll;

a tension adjusting roller located under the front of the first guide roll and maintained in spaced relation to the first guide roll, connected as an engagement structure which is movable upward/downward, and configured to adjust tension of the spacer guided through the first guide roll; and a second guide roll rotatably installed above the front of the tension adjusting roller and maintained a spaced relation to the tension adjusting roller, and configured to guide the spacer, whose tension is adjusted through the tension adjusting roller, to the outside of the magazine unit, wherein the first guide roll, the tension adjusting roller and the second guide roll are disposed in an inverse triangle shape.

7. The apparatus for application of foam spacer of claim 6, further comprising a rail disposed in a vertical direction so as to be engaged with the tension adjusting roller for an operation of moving the tension adjusting roller upward/downward.

8. The apparatus for application of foam spacer of claim 6, further comprising:

a pair of coating pressure parts installed in a front area of the winding roll, and configured to store a sealant and provide pressure for injecting the sealant to both side surfaces of the spacer;

a pair of two sets of injection blocks arranged above the coating pressure parts so as to face each other, and configured to inject and apply the sealant to both side surfaces of the spacer guided through the second guide roll;

a plurality of first direction turning rolls installed at a higher position than the injection blocks between the injection blocks, and configured to horizontally guide the spacer while restricting the direction of the spacer passed between the injection blocks; and a plurality of second direction turning rolls located ahead of and maintained in spaced relation to the first direction turning rolls, and configured to change the direction of the spacer to the reverse direction.

9. The apparatus for application of foam spacer of claim 8, further comprising:

a tension adjusting roller mounted on the top of the magazine unit, connected and engaged with rails formed on both sides of a tension adjusting structure inclined toward the foam head unit, and configured to adjust the tension of the spacer while changing the direction of the spacer guided through the second direction turning roll to the forward direction; and a pair of ending supply rolls rotatably installed at a front end of the tension adjusting structure, and configured to supply and guide the spacer, whose tension thereof is adjusted by the tension adjusting roller, to the foam head unit.

* * * * *